(No Model.)

C. B. AXT.
MEANS FOR FASTENING OBJECTS TO IRON BEAMS.

No. 359,310. Patented Mar. 15, 1887.

Witnesses.
Anthony Steffen
Bruno Silvester

Inventor.
Carl Bernhard Axt
By Edwin A. Brydges
Attorney.

UNITED STATES PATENT OFFICE.

CARL BERNHARD AXT, OF CHEMNITZ, SAXONY, GERMANY.

MEANS FOR FASTENING OBJECTS TO IRON BEAMS.

SPECIFICATION forming part of Letters Patent No. 359,310, dated March 15, 1887.

Application filed September 9, 1886. Serial No. 213,155. (No model.) Patented in Germany April 2, 1886, No. 37,019.

*To all whom it may concern:*

Be it known that I, CARL BERNHARD AXT, of the city of Chemnitz, in the Kingdom of Saxony and German Empire, have invented a certain new and useful Improved Method of Fastening Objects of Iron by Means of Nails, (for which I have obtained a patent in Germany, under No. 37,019, dated April 2, 1886,) of which the following is a specification.

My invention relates to an improved method of fastening objects to iron by means of nails.

The methods of attaching objects to iron by means of nails hitherto known are based on the clinching of the said nails in or after driving in the same. This method, however, offers little security, as the nails frequently bend over to the wrong side, or when driven in against an iron clinching-surface do not bend or clinch at or near the point, but in the middle, thus in many instances rendering the attachment illusory.

Figure 1:
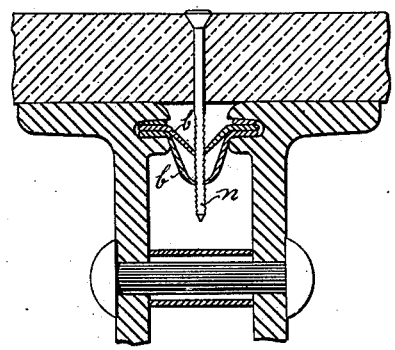
Figure 2:
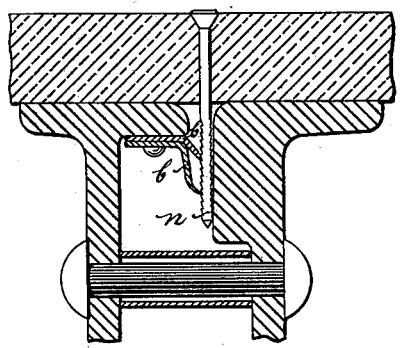

Figures 1 and 2 are two vertical sections representing my improved method of attachment.

According to my improved method it is not necessary that the nail $n$ should be clinched over in the form of a hook or formed into a loop, the same being driven between the jaws of one or more sheet-iron or other suitable angles, $b$. The nail is grooved or provided with suitable annular or other recesses, ribs, teeth, or screw-threads, so that the jaws of the angles $b$ will act as a system of pawls in the recesses of the said nail, and will firmly hold the same and prevent all retrograde motion or loosening of the attachment.

Having now described my said invention and in what manner the same is to be performed, what I claim is—

1. The improved means of attaching objects to iron, which consists of a nail or pin having ribs or serrations and an elastic jaw arranged to engage with and prevent back movement of said nail or pin, substantially as described and shown.

2. The combination, with the nail or pin, of elastic jaws B, secured in or upon the iron, substantially as described, and for the purpose set forth.

In witness whereof I have hereunto signed my name in the presence of two subscribing witnesses.

CARL BERNHARD AXT.

Witnesses:
 WILLIAM R. MATTHES,
 OTTO THEUERKORN.